United States Patent
Singer et al.

(10) Patent No.: US 10,175,501 B1
(45) Date of Patent: Jan. 8, 2019

(54) WEARABLE ITEM HAVING A BI-STABLE MECHANISM

(71) Applicants: Kenzo Singer, Santa Barbara, CA (US); Mark Singer, Santa Barbara, CA (US)

(72) Inventors: Kenzo Singer, Santa Barbara, CA (US); Mark Singer, Santa Barbara, CA (US)

( * ) Notice: Subject to any disclaimer, the term of this patent is extended or adjusted under 35 U.S.C. 154(b) by 0 days.

(21) Appl. No.: 15/883,345

(22) Filed: Jan. 30, 2018

(51) Int. Cl.
| G02C 5/20 | (2006.01) |
| G02C 5/14 | (2006.01) |
| A44C 5/00 | (2006.01) |

(52) U.S. Cl.
CPC ............ G02C 5/143 (2013.01); A44C 5/0007 (2013.01); G02C 5/20 (2013.01); *G02C 2200/02* (2013.01); *G02C 2200/06* (2013.01)

(58) Field of Classification Search
CPC ............ G02C 5/006; G02C 5/08; G02C 5/20
USPC ................ 351/63, 118, 119; 2/454
See application file for complete search history.

(56) References Cited

U.S. PATENT DOCUMENTS

| 2,975,426 A * | 3/1961 | Rabb ...................... G02C 5/006 2/13 |
| 3,395,964 A * | 8/1968 | Nieder ...................... G02C 5/06 351/113 |
| 4,183,171 A | 1/1980 | Terzian |
| 4,720,186 A | 1/1988 | Douillard |
| 6,943,653 B2 | 9/2005 | Hanke et al. |
| 7,251,323 B2 | 7/2007 | Holtorf et al. |
| 7,287,851 B2 | 10/2007 | Amioka |
| 7,748,843 B2 | 7/2010 | Stewart |
| 8,317,317 B2 | 11/2012 | Pulvino et al. |
| 9,122,075 B2 | 9/2015 | Butler |
| 9,298,011 B2 | 3/2016 | Pombo |
| 9,726,902 B2 | 8/2017 | Shalon |
| 2008/0036962 A1 | 2/2008 | Alitowski |
| 2011/0228210 A1 | 9/2011 | Willett |
| 2015/0338677 A1 | 11/2015 | Block |
| 2016/0223832 A1 | 8/2016 | Hall |

FOREIGN PATENT DOCUMENTS

| CN | 202404316 | 8/2012 |
| DE | 202016002203 | 8/2016 |
| GB | 2477467 | 3/2011 |

OTHER PUBLICATIONS

G&G Folding Bridge Reading Glasses with Zipper Carry Case Orange 2.0, Oct. 30, 2017.
Ray Ban 3479 Folding Aviator Glasses, Jul. 20, 2015.
SlapSee Slap Bracelet Sunglasses, Jul. 1, 2015.
Zapals, Wrist Slapping Sunglasses Polarized UV 400 Folding Eyewear, Oct. 30, 2017.

* cited by examiner

*Primary Examiner* — Hung Dang
(74) *Attorney, Agent, or Firm* — Risso I.P.

(57) ABSTRACT

Described is a wearable item, such as eyewear, that is formed to be stored and worn on a user's wrist. The eyewear includes a pair of lenses separated by a nose bridge assembly. Arms are affixed with each of the lenses. Notably, the pair of lenses are foldable between an open configuration in which they can be worn as eyeglasses and a collapsed configuration in which they fold toward one another and can be worn on the user's wrist.

18 Claims, 8 Drawing Sheets

WEARABLE ITEM HAVING A BI-STABLE MECHANISM

BACKGROUND OF THE INVENTION

(1) Field of Invention

The present invention relates to wearable items and, more particularly, to eyewear or other wearable items that include a bi-stable mechanism and that is formed such that it can be stored and worn on the wrist of a user.

(2) Description of Related Art

Eyeglasses have long been known in the art. While being used and as can be appreciated by those skilled in the art, eyeglasses are worn on the user's face to assist the user in seeing and/or reading, etc. However, when not in use there is a need to store such eyeglasses. Eyeglasses are traditionally stored in an eyeglass case. While operable for storage, the eyeglass case is a bulky item that cannot be easily carried by the user. To address this issue, other storage techniques have been devised, such as neck straps or lanyards in which the eyeglasses are worn around the user's neck. When eyeglasses are stored around the user's neck they have a tendency to swing and can often be in the user's way. Such a storage technique may not be considered fashionable to many users. Further, existing storage techniques are not generally compact or ergonomic.

Thus, a continuing need exists for eyewear that can be easily stored by the user in a fashionable, compact, ergonomic, and stable manner while still being easily accessible for ease of use.

SUMMARY OF INVENTION

This disclosure is directed to a wearable item formed to transition between a stable open configuration and a stable collapsed configuration. In various embodiments, the wearable item includes a bi-stable mechanism that is bi-stable in both an open configuration and a collapsed configuration.

In other aspects, the bi-stable mechanism includes both a spring and a compression strut.

In yet other aspects, a pair of frame members is connected with and separated by the bi-stable mechanism.

In another aspect, the compression struct exerts a counterbalancing force up to an inflection point to maintain the spring in the open configuration, whereby in moving the frame members toward one another from the open configuration, the compression strut bends to the inflection point at which point the closing force of the spring is greater than the counterbalancing force of the compression strut, thereby allowing the spring and wearable item to return to the collapsed configuration.

Additionally, the spring is at rest when in the closed configuration and exerts a closing force when in the open configuration.

Further, the wearable item is eyewear and the bi-stable mechanism is a nose bridge assembly, and further comprising a lens affixed with each frame member.

In another aspect, an arm is affixed with each frame member.

Further, when the eyewear is in the collapsed configuration, the frame members in conjunction with the arms and lens form a clamshell-shaped enclosure, thereby allowing the eyewear to be stored or worn on a user's wrist.

In another aspect, each frame member includes an end piece and each arm includes an arm tip, wherein each end piece includes a tip receptacle formed to receive and affix with an arm tip.

Additionally, the arm tip and end pieces are formed to be magnetically connected with one another.

In another aspect, each arm is a telescoping arm having a series of telescoping parts that allow the arms to extend out for the open configuration or nest and collapse into the collapsed configuration.

In yet another aspect, each arm is formed of a length such that when worn on a user's face, the arm tips rest against a user's temple.

In another aspect, a clip is connected with the frame members, the clip being biased to allow the eyewear to clip directly to a user's nose when worn in an open configuration.

Finally, as can be appreciated by one in the art, the present invention also comprises a method for forming and using the invention described herein.

BRIEF DESCRIPTION OF THE DRAWINGS

The objects, features and advantages of the present invention will be apparent from the following detailed descriptions of the various aspects of the invention in conjunction with reference to the drawings submitted herewith, as follows.

DETAILED DESCRIPTION

Figure 1A:
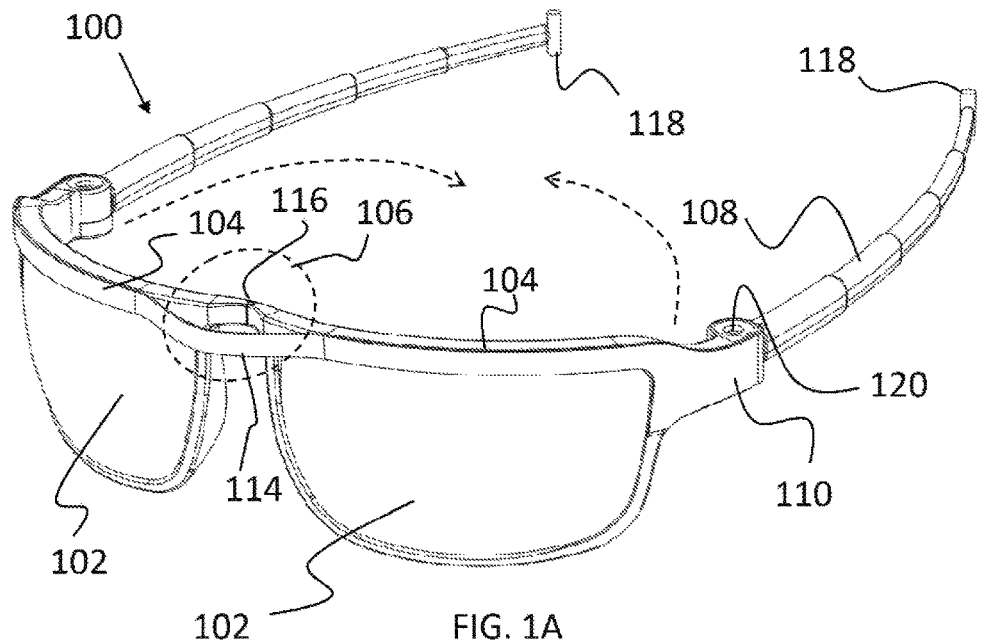
FIG. 1A is a front, isometric-view illustration depicting eyewear in an open configuration according to various embodiments of the present invention.

The present invention relates to wearable items and, more particularly, to eyewear or other wearable items that include a bi-stable mechanism and that is formed such that it can be stored and worn on the wrist of a user. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is only one example of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Description

This disclosure is directed to a wearable item that includes a bi-stable mechanism providing for both an "open" or expanded configuration and a "collapsed" configuration in which the wearable item can be stored and worn on the wrist of a user or any other desired location. As can be appreciated by those skilled in the art, the bi-stable mechanism can be incorporated into a variety of wearable items, such as eyewear, a watch, etc. Although eyewear is depicted throughout the figures and provided as an example embodiment, it should be understood that the features and aspects as described with respect to eyewear can also be incorporated into a variety of wearable items (e.g., watch, bracelet, etc.) and, as such, the invention is not intended to be limited to eyewear.

Figure 1B:
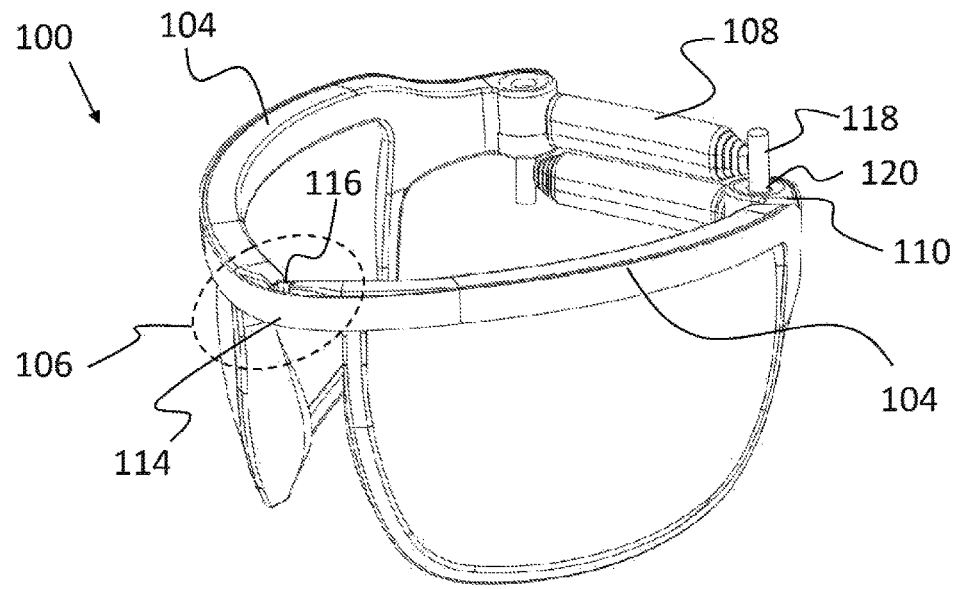
FIG. 1B is a front, isometric-view illustration depicting the eyewear in a collapsed configuration.

For example and as shown in FIGS. 1A and 1B, the eyewear 100 has at least two stable configurations. As shown in FIG. 1A, the eyewear 100 is stable an in open configuration in which it operates and is shaped similar to that of conventional eyeglasses. The eyewear 100 includes a pair of lenses 102, each of which is connected with a frame member 104. When incorporated into eyewear 100, the bi-stable mechanism takes the form of a nose bridge assembly 106 that connects the frame members 104 and is formed to allow the pair of lenses 102 and corresponding frame members 104 to fold from the open to collapsed configuration (or vice versa).

As shown in FIG. 1B, the eyewear 100 can be collapsed and folded into the collapsed configuration such that it wraps securely around the user's wrist or any other item or appendage (e.g., ankle, etc.). In transitioning to the collapsed configuration, the nose bridge assembly 106 folds to allow the frame members 104 to rotate toward one another into a U-shaped configuration that is ergonomic and compact.

Figure 1C:
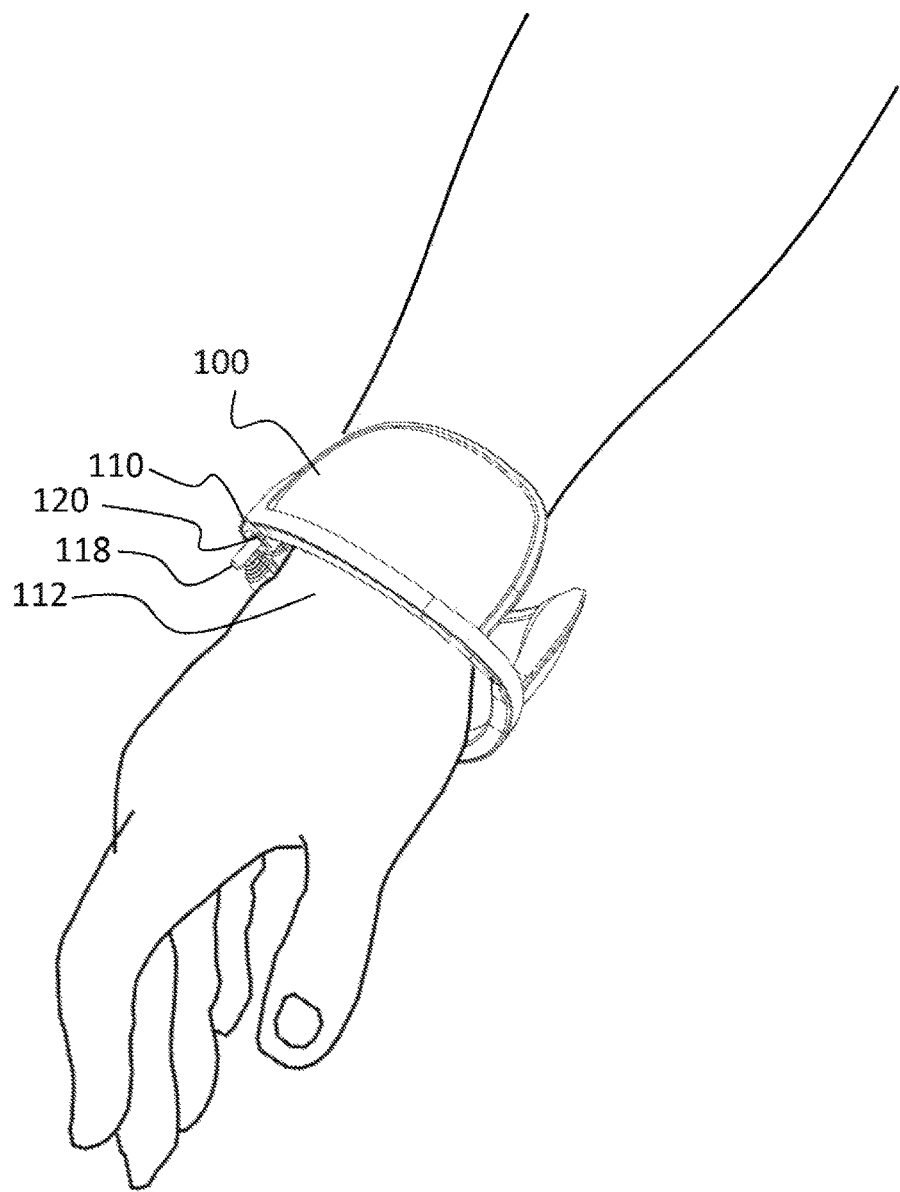
FIG. 1C is an illustration depicting the eyewear in the collapsed configuration and wrapped around a user's wrist.

The bi-stable mechanism (e.g., nose bridge assembly 106) is formed of any suitable mechanism or device that allows for the frame members 104 to fold between and be stable in the two configurations. For example, the nose bridge assembly 106 acts as a bi-stable spring. In this aspect, it springs and is stable in the open position (shown in FIG. 1A). Once the nose bridge assembly 106 is manually closed past an inflection point, it springs into the collapsed configuration which in essence allows the frame members 104 to fold toward one another and into a shape that would easily wrap around the user's wrist or any other item. While in the collapsed configuration, the frame members 104 are U-shaped or otherwise form a clamshell shape that generally conforms to the wrist shape of a user for an ergonomic and comfortable storage configuration. For example, FIG. 1C illustrates the eyewear 100 as wrapped around a user's wrist 112. As shown in FIG. 1C, the eyewear 100 is folded into a U-shaped or clamshell shape that allows it to comfortably conform to the shape of the user's wrist.

Figure 4:
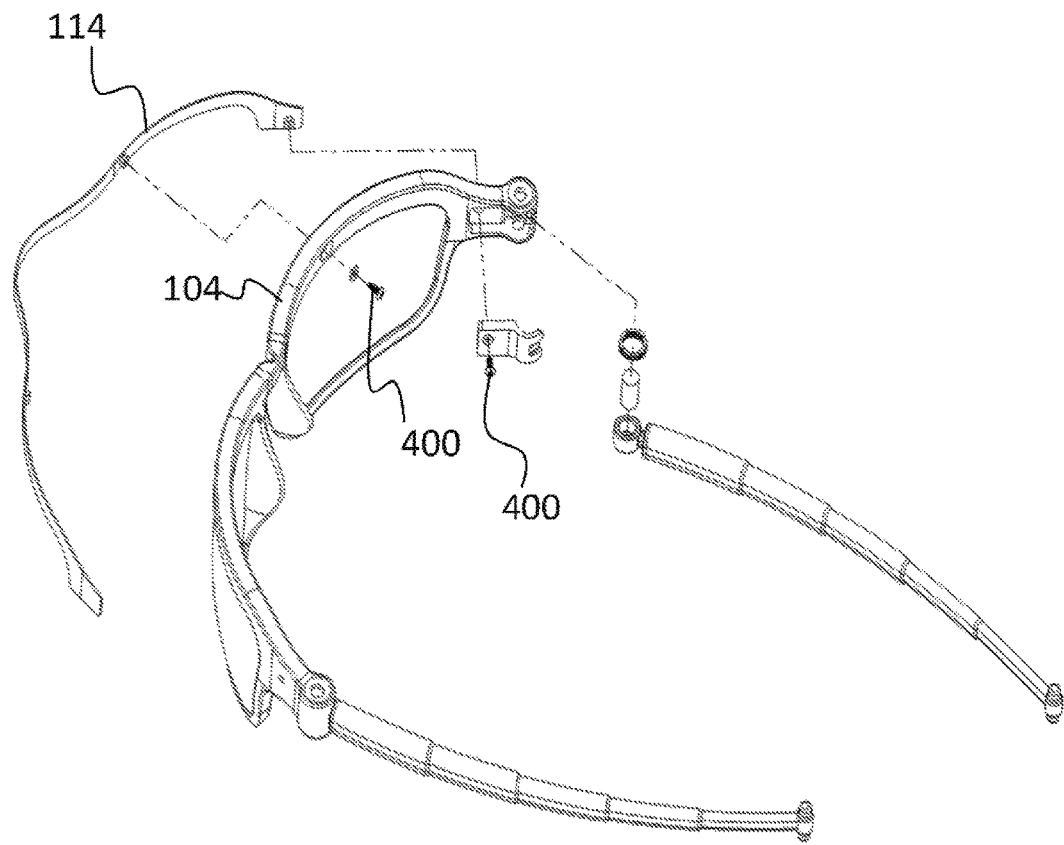
FIG. 4 is an isometric, exploded-view illustration depicting the eyewear in an open configuration.

The bi-stable mechanism or nose bridge assembly 106 can be formed in any suitable manner to allow for the bi-stable configuration. As a non-limiting example and referring again to FIG. 1A, the nose bridge assembly 106 (i.e., bi-stable mechanism) includes a flat spring 114 and a compression strut 116. It should be noted that the bi-stable mechanism (e.g., nose bridge assembly 106) and its corresponding parts (i.e., the spring 114 and compression strut 116) can be separately formed and attached with the frame members 104 (via screws or fasteners, adhesives, plastic wielding, etc.) or, in other embodiments, integrally formed as a piece of the frame member 104 (or any combination thereof). As a non-limiting example and as depicted in the exploded view illustration of FIG. 4, the spring 114 is affixed with the frame members 104 via fasteners 400 (e.g., screws).

Figure 5A:
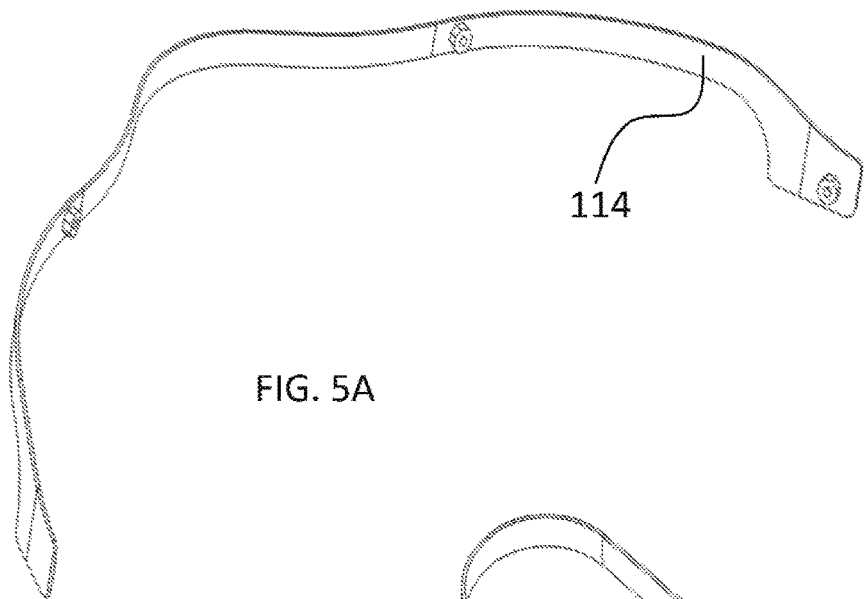
FIG. 5A is an isometric-view illustration depicting a spring in an open configuration.
Figure 5B:
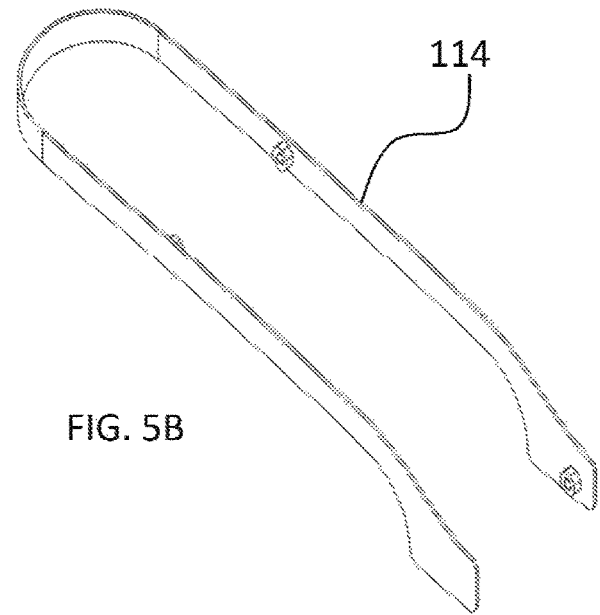
FIG. 5B is an isometric-view illustration depicting the spring in a collapsed configuration.

Referring to FIG. 5B, the flat spring 114 is curved or bent when in a natural or relaxed state. The spring 114 is what forces the bi-stable mechanism to close, as the spring 114 wants to return to its original curved shape (depicted in FIGS. 1B and 5B) when bent into the open configuration (as shown in FIGS. 1A and 5A). As an external force (e.g., the user) opens the wearable item and corresponding bi-stable mechanism (e.g., nose bridge assembly 106), the nose bridge assembly 106 moves from its stable closed state (collapsed configuration), beyond an inflection point and into a stable open state (open configuration). When bent into the open configuration and as shown in FIGS. 1A and 5A, the spring 114 exerts forces to collapse and return to the collapsed configuration. Although the spring 114 exerts forces to return to the collapsed configuration, the closing force of the spring 114 is counterbalanced by the compression strut 116 in the stable open configuration.

The compression strut 116 is able to rotate or bend such that it can act in compression when open, but also be bent into the collapsed configuration. This can be achieved, for example, by a hinge or living hinge, or a flexible material or spring with sufficient compressive strength. In other words, the compression strut 116 is formed to favor the open configuration and provides a counterbalancing force to the spring 114, at least prior to an inflection point.

Figure 2A:
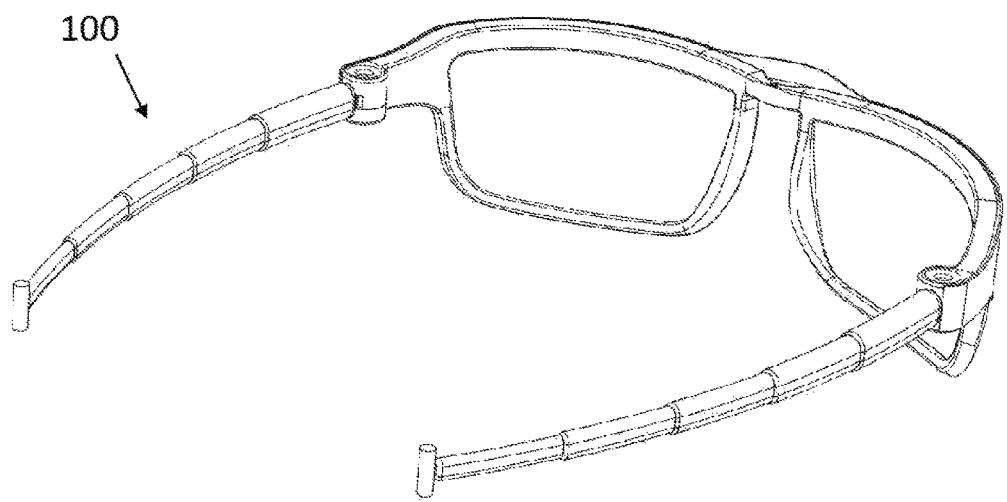
FIG. 2A is a rear, isometric-view illustration depicting the eyewear in an open configuration.
Figure 2B:
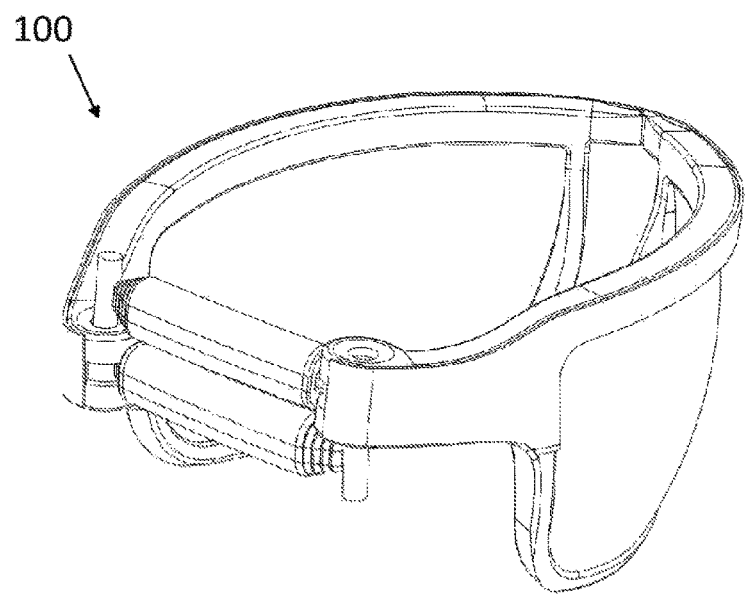
FIG. 2B is a rear, isometric-view illustration depicting the eyewear in a collapsed configuration.
Figure 3A:
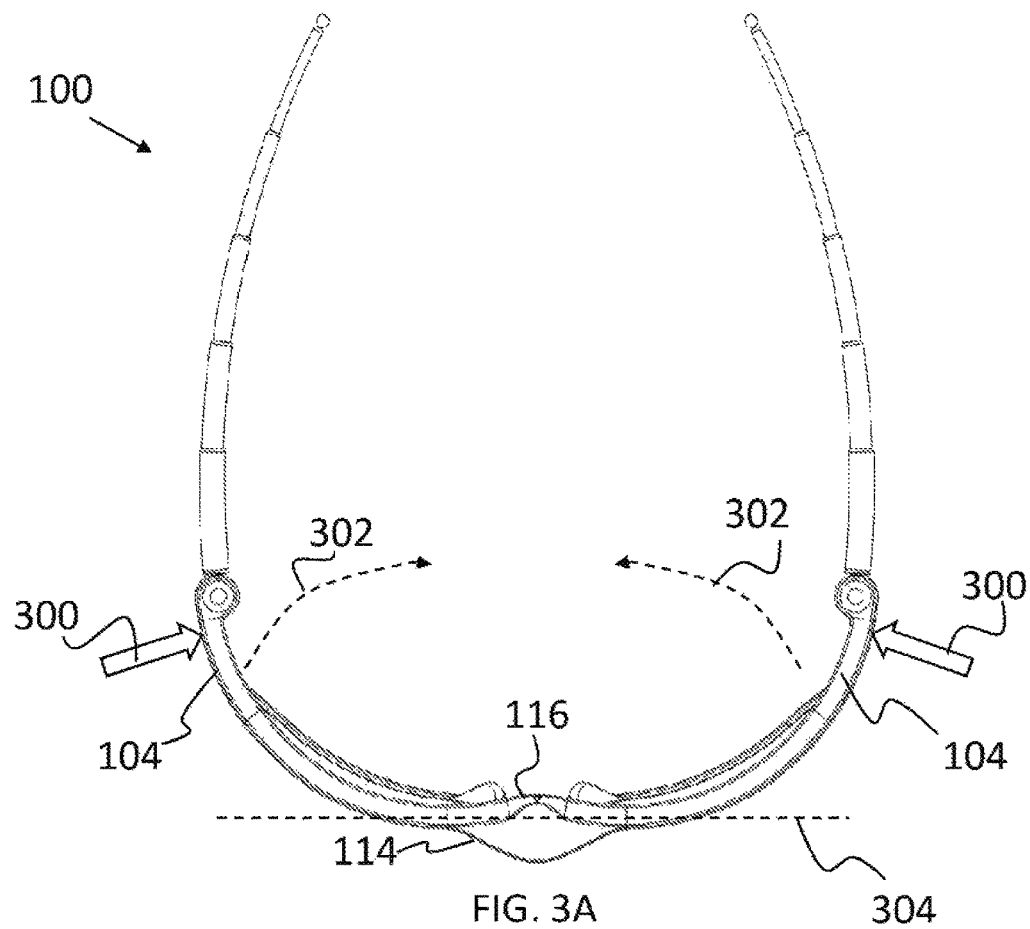
FIG. 3A is a top-view illustration depicting the eyewear in an open configuration.
Figure 3B:
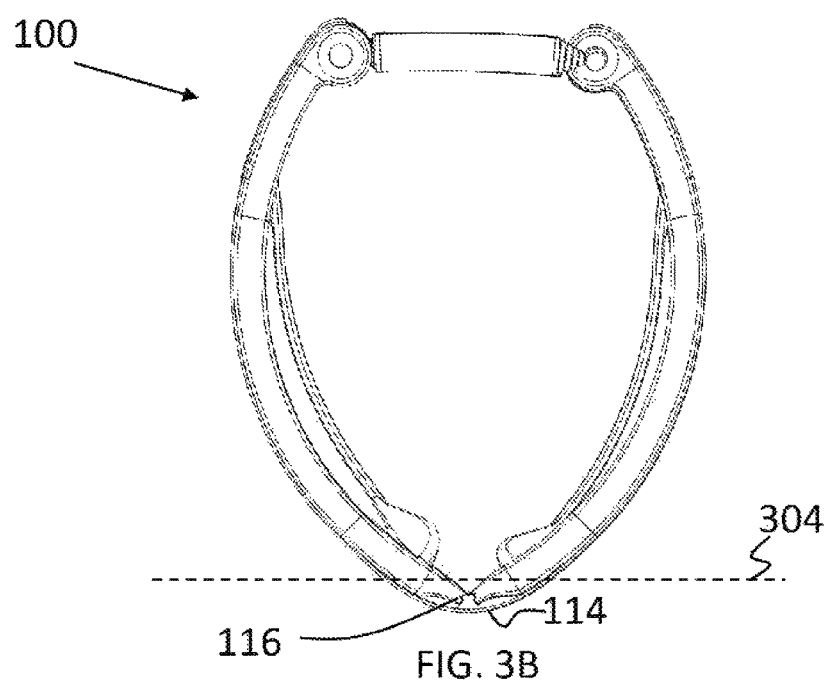
FIG. 3B is a top-view illustration depicting the eyewear in a collapsed configuration.

As shown in the top-view illustrations of FIGS. 3A and 3B, in order to close the mechanism or otherwise cause the eyewear 100 to transition from the open to collapsed configuration, an external force 300 is applied (by the user) to rotate 302 the frame members 104 toward one another. In moving the frame members 104 toward one another, the compression strut 116 rotates or bends to the inflection point, where it no longer counterbalances the closing force of the spring 114. From there, the closing force of the spring 114 is greater than the counterbalancing forces of the compression strut 116, which allows the spring 114 to return the nose bridge assembly and corresponding wearable item (e.g., eyewear 100) to its stable collapsed configuration or state (as shown in FIG. 3B). For further understanding, FIGS. 2A and 2B also illustrate the eyewear 100 in the open and collapsed configurations.

The spring 114 can be formed of any suitable material to provide for the forces as necessary to transition from the open to closed configurations, non-limiting examples of which include metal, plastic, composites, etc. Further, although the spring 114 is depicted as being fixed with the frame members 104, it should be noted that the invention is not intended to be limited thereto as it can also be mounted on sliders for size adjustability and/or improved ergonomics. Additionally, the compression strut 116 can be formed of any suitable material and in any suitable form to provide the counterbalancing forces to maintain the eyewear 100 in the open configuration, non-limiting examples include being a hinge or living hinge made of a flexible material formed of varying span and/or thickness and formed of metal, rubber, plastic, and/or composites.

In other example embodiments, the bi-stable mechanism (e.g., nose bridge assembly 106) can be formed using any other configuration that allows for two or more stable states. For example, the bi-stable mechanism can be formed as a bendable/formable/flexible bridge, such as a bendable wire. Another example includes forming the bi-stable mechanism as a hinged assembly with detents or controlled internal friction to allow the bi-stable mechanism to retain position between the various configurations.

In some embodiments and referring again to FIG. 1A, arms 108 (or temples) are connected with the frame members 104 for affixing the eyewear 100 with a user's ears or head. The arms 108 can be formed in any suitable manner such that they position the lenses 102 proximate the user's eyes when worn as eyewear 100. For example, the arms 108 can simply be traditional rigid arms (not depicted) that are hingedley connected with the lenses 102 and/or frame members 104.

In yet another non-limiting example and as depicted in FIGS. 1A through 4, the arms 108 can be formed such that they telescope onto themselves. For example, the arms 108 can be formed of a series of telescoping parts that allow the arms 108 to extend out and be of sufficient length such that they can rest upon a user's ears (as shown in FIG. 1A). Alternatively, the telescoping parts of the arm 108 can nest or otherwise collapse into a collapsed configuration (as shown in FIG. 1B). In this aspect and in the collapsed configuration, the arms 108 are short enough to avoid protruding off of the wrist when worn by the user. In various embodiments, the arms 108 are pivotally connected with end pieces 110 of the frame members 104 (as shown in FIGS. 1A and 1B), while in other embodiments the arms 108 are fixedly connected with the end pieces 110.

In some embodiments, when the arms 108 are in the collapsed configuration (as shown in FIG. 1B), the arms 108 cross and provide a closing face to the lens/bridge assembly when worn on the user's wrist. This option (or any other option as desired) can use magnets (or other connections or fasteners) on the arms 108 to further secure the wrist or collapsed configuration. For example, a tip 118 can be attached with the distal end of each arm 108. Further, the end piece 110 can be formed to include a tip receiver 120 to mate with or otherwise maintain a secure connection with the tip 118. As a non-limiting example, the tip 118 is formed as a protrusion (e.g., rod, etc.) and the tip receiver 120 includes a receptacle for receiving the tip 118. Further, either the tip 118 and/or tip receiver 120 can be formed to include a magnet or be formed of metal to allow the tip 118 and tip receiver 120 to maintain a magnetic connection with one another. As a non-limiting example, the tip 118 includes a magnet while the tip receiver 120 is formed of a suitable metal to provide for a magnetic connection between the two components. For example and as shown in FIG. 1B, the tip 118 is matingly engaged with the tip receiver 120 and end piece 110 to secure the eyewear 100 in the collapsed configuration which can be securely worn on the wrist 112 of a user (as shown in FIG. 1C).

Figure 6A:
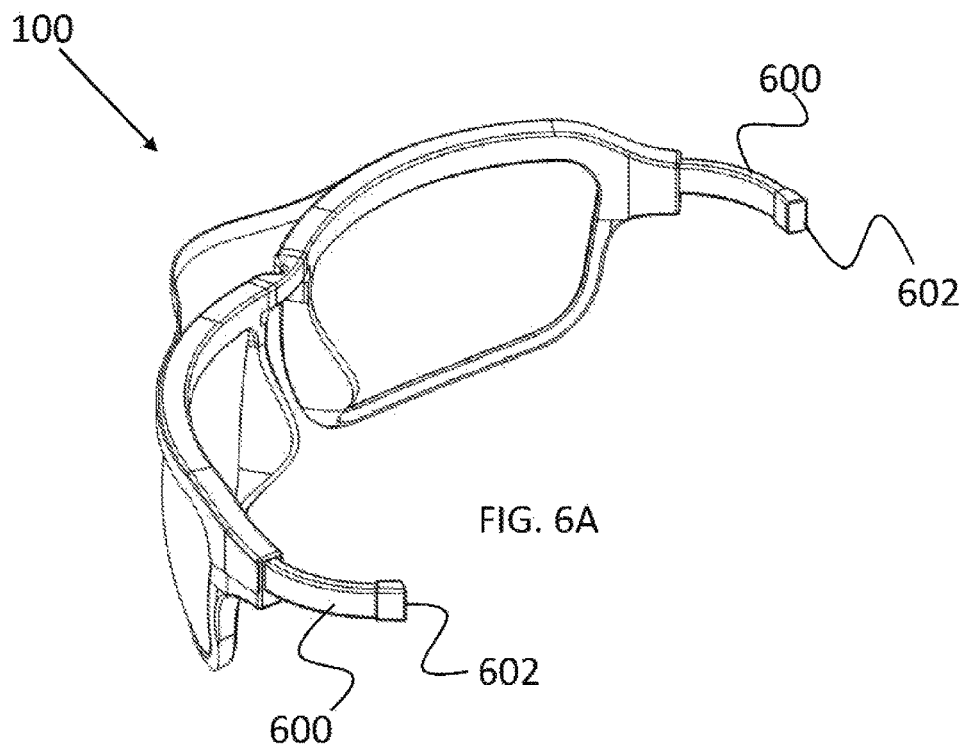
FIG. 6A is a rear, isometric-view illustration depicting the eyewear in an open configuration.
Figure 6B:
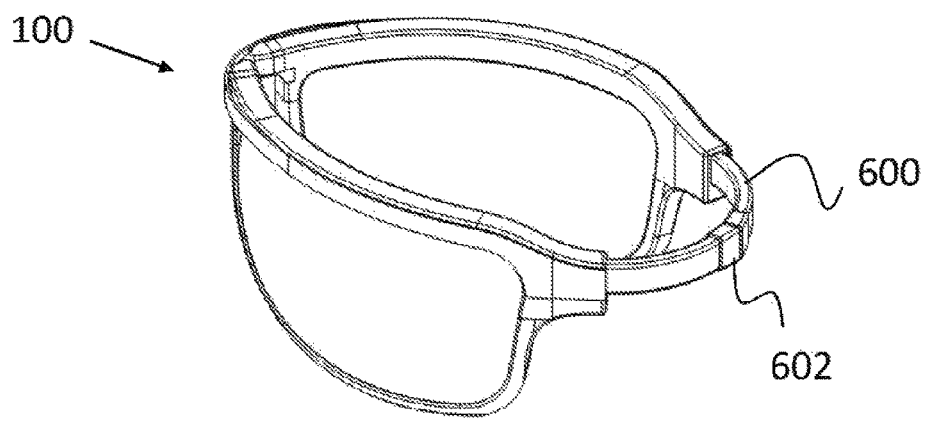
FIG. 6B is a rear, isometric-view illustration depicting the eyewear in a collapsed configuration.

It should be noted that although the wearable item or eyewear 100 is depicted as having telescoping arms 108, the invention is not intended to be limited thereto as any suitable arm configuration can be employed (or in other embodiments, no arms whatsoever). For example and as shown in FIGS. 6A and 6B, the eyewear 100 can be formed to include short arms 600 that simply contact or "pinch" the user's temples to hold the eyewear 100 on the user's face, with the arm tips resting or otherwise positioned proximate the user's temples. For example, the short arms 600 have a length (e.g., between ½ an inch and 2 inches, or any other designed or desired length) such that the arm tips rest or otherwise are positioned proximate the user's temples. In this example there is no need for a telescoping action as the arms 600 are short enough to provide the collapsed configuration (as shown in FIG. 6B) and complete the wrist wrap. Also depicted are the tips 602 that are attached with or otherwise formed on the distal end of each of the arms 600. In this example, the tips 602 are formed in any suitable manner to be attached with one another to secure the eyewear 100 in the collapsed configuration. As a non-limiting example, the tips 602 are formed of a magnet and/or metal (or any combination thereof) to allow the tips 602 to adhere to one another. For example, one tip 602 can be formed of a magnet while the other tip 602 is formed of metal. Alternatively, both tips 602 can include magnets that are positioned such that the positive and negative ends of the magnets face each other when connected.

Figure 7:
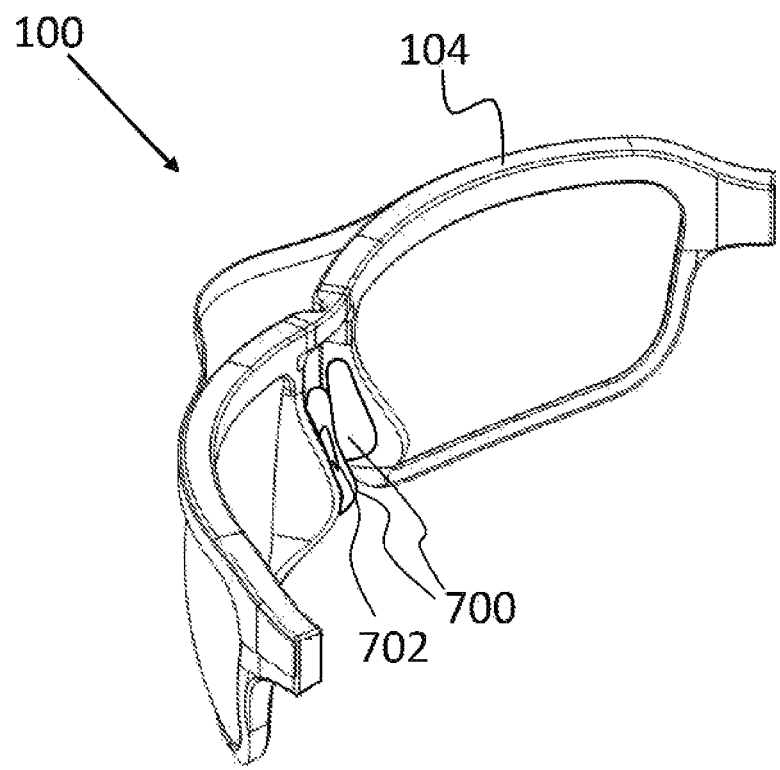
FIG. 7 is an image depicting an embodiment in which the eyewear includes a clip or biased nose pads that allow the eyewear to clip directly to the user's nose.

In other embodiments and as shown in FIG. 7, the eyewear 100 can be formed with no arms and, instead, includes a clip 700 (e.g., biased nose pads) that allow the eyewear 100 to clip directly to the user's nose. The clip 700 can include nose pads attached with the frame members 104 or at any other suitable location that are biased toward one another (e.g., U-shaped metal, plastic, or spring-loaded 702 pads, etc.) to clip the nose therebetween. Other example embodiments include arms that are flexible or segmented that can coil around the user's wrist.

As noted above, the bi-stable mechanism as described herein can be incorporated into a variety of wearable items. In addition to eyewear, non-limiting examples of additional applications include incorporating the bi-stable mechanism into bracelets or electronic wearables, such as smart watches, augmented reality and/or virtual reality glasses, smart watches that convert to augmented reality and/or virtual reality glasses, and fitness trackers.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A wearable item formed to transition between a stable open configuration and a stable collapsed configuration, comprising:
   a bi-stable mechanism, the bi-stable mechanism being bi-stable in both an open configuration and a collapsed configuration; and
   a pair of frame members connected with and separated by the bi-stable mechanism; and
   wherein the bi-stable mechanism includes both a spring and a compression strut operable for holding the wearable item in both the open and collapsed configurations.

2. The wearable item as set forth in claim 1, wherein the wearable item is eyewear and the bi-stable mechanism is a nose bridge assembly, and further comprising a lens affixed with each frame member.

3. The wearable item as set forth in claim 1, wherein the wearable item is eyewear and the bi-stable mechanism is a nose bridge assembly, and further comprising an arm affixed with each frame member.

4. The wearable item as set forth in claim 3, wherein each arm is formed of a length such that when worn on a user's face, the arm tips rest against a user's temple.

5. A wearable item formed to transition between a stable open configuration and a stable collapsed configuration, comprising:
   a bi-stable mechanism, the bi-stable mechanism being bi-stable in both an open configuration and a collapsed configuration;
   wherein the bi-stable mechanism includes both a spring and a compression strut;
   a pair of frame members connected with and separated by the bi-stable mechanism; and
   wherein the compression strut exerts a counterbalancing force up to an inflection point to maintain the spring in the open configuration, whereby in moving the frame members toward one another from the open configuration, the compression strut bends to the inflection point at which point the closing force of the spring is greater than the counterbalancing force of the compression strut, thereby allowing the spring and wearable item to return to the collapsed configuration.

6. The wearable item as set forth in claim 5, wherein the spring is at rest when in the closed configuration and exerts a closing force when in the open configuration.

7. The wearable item as set forth in claim 6, wherein the wearable item is eyewear and the bi-stable mechanism is a nose bridge assembly, and further comprising a lens affixed with each frame member.

8. The wearable item as set forth in claim 7, further comprising an arm affixed with each frame member.

9. The wearable item as set forth in claim 8, wherein when the eyewear is in the collapsed configuration, the frame members in conjunction with the arms form a clamshell shaped enclosure, thereby allowing the eyewear to be stored or worn on a user's wrist.

10. The wearable item as set forth in claim 9, wherein each frame member includes an end piece and each arm includes an arm tip, wherein each end piece includes a tip receptacle formed to receive and affix with an arm tip.

11. The wearable item as set forth in claim 10, wherein the arm tip and end pieces are formed to be magnetically connected with one another.

12. The wearable item as set forth in claim 11, wherein each arm is a telescoping arm having a series of telescoping parts that allow the arms to extend out for the open configuration or nest and collapse into the collapsed configuration.

13. The wearable item as set forth in claim 11, wherein each arm is formed of a length such that when worn on a user's face, the arm tips rest against a user's temple.

14. Wearable eyewear formed to transition between a stable open configuration and a stable collapsed configuration, comprising:
   a pair of frame members having lenses attached thereto, the pair of frame members being connected with and separated from one another by a nose bridge assembly;
   wherein the nose bridge assembly includes a bi-stable mechanism, the bi-stable mechanism being bi-stable in both an open configuration and a collapsed configuration; and
   wherein when the eyewear is in the collapsed configuration, the frame members in conjunction with the arms form a clamshell-shaped enclosure having an open space framed by the frame members and arms, the open space having an area sufficient to accommodate a wrist of a user, thereby allowing the eyewear to be stored or worn on the user's wrist.

15. A wearable item formed to transition between a stable open configuration and a stable collapsed configuration, comprising:
   a bi-stable mechanism, the bi-stable mechanism being bi-stable in both an oven configuration and a collapsed configuration;
   a pair of frame members connected with and separated by the bi-stable mechanism;
   an arm affixed with each frame member; and
   wherein each frame member includes an end piece and each arm includes an arm tip, wherein each end piece includes a tip receptacle formed to receive and affix with an arm tip.

16. The wearable item as set forth in claim 15, wherein the arm tip and end pieces are formed to be magnetically connected with one another.

17. A wearable item formed to transition between a stable oven configuration and a stable collapsed configuration, comprising:
   a bi-stable mechanism, the bi-stable mechanism being bi-stable in both an open configuration and a collapsed configuration;
   a pair of frame members connected with and separated by the bi-stable mechanism;
   an arm affixed with each frame member; and
   wherein each arm is a telescoping arm having a series of telescoping parts that allow the arms to extend out for the open configuration or nest and collapse into the collapsed configuration.

18. A wearable item formed to transition between a stable open configuration and a stable collapsed configuration, comprising:

a bi-stable mechanism, the bi-stable mechanism being bi-stable in both an open configuration and a collapsed configuration;
a pair of frame members connected with and separated by the bi-stable mechanism; and
wherein the wearable item is eyewear and the bi-stable mechanism is a nose bridge assembly, and further comprising a lens affixed with each frame member and a clip connected with the frame members, the clip being biased to allow the eyewear to clip directly to a user's nose when worn in an open configuration.

* * * * *